(12) United States Patent
Kim

(10) Patent No.: US 9,293,756 B2
(45) Date of Patent: Mar. 22, 2016

(54) RECHARGEABLE BATTERY

(75) Inventor: Sung-Bae Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 446 days.

(21) Appl. No.: 12/982,575

(22) Filed: Dec. 30, 2010

(65) Prior Publication Data

US 2012/0070705 A1 Mar. 22, 2012

Related U.S. Application Data

(60) Provisional application No. 61/384,148, filed on Sep. 17, 2010.

(51) Int. Cl.
| | |
|---|---|
| *H01M 2/34* | (2006.01) |
| *H01M 2/04* | (2006.01) |
| *H01M 2/30* | (2006.01) |
| *H01M 10/04* | (2006.01) |
| *H01M 10/42* | (2006.01) |
| *H01M 10/0525* | (2010.01) |

(52) U.S. Cl.
CPC ............. *H01M 2/34* (2013.01); *H01M 2/043* (2013.01); *H01M 2/305* (2013.01); *H01M 2/345* (2013.01); *H01M 10/0413* (2013.01); *H01M 10/0431* (2013.01); *H01M 10/42* (2013.01); *H01M 10/0525* (2013.01); *H01M 2200/20* (2013.01)

(58) Field of Classification Search
CPC ..... H01M 2/021; H01M 2/0217; H01M 2/34; H01M 2/345; H01M 10/445; H01M 2200/20
USPC ....................................................... 429/61, 53
See application file for complete search history.

(56) References Cited

U.S. PATENT DOCUMENTS

| | | | |
|---|---|---|---|
| 6,143,440 A | 11/2000 | Volz et al. | |
| 7,467,647 B1 | 12/2008 | Wilk | |
| 7,754,372 B2 * | 7/2010 | Kwon et al. | .................... 429/53 |
| 7,763,375 B2 | 7/2010 | Igoris et al. | |
| 8,236,439 B2 | 8/2012 | Byun et al. | |
| 2005/0266302 A1 | 12/2005 | Kim | |
| 2006/0251930 A1 | 11/2006 | Kim | |

(Continued)

FOREIGN PATENT DOCUMENTS

| | | |
|---|---|---|
| CN | 100375318 C | 3/2008 |
| EP | 1076350 | * 11/2002 |

(Continued)

OTHER PUBLICATIONS

KIPO Notice of Allowance dated Dec. 4, 2012, for corresponding Korean Patent application 10-2011-0005071, (5 pages).

(Continued)

*Primary Examiner* — Ula C Ruddock
*Assistant Examiner* — Thomas Parsons
(74) *Attorney, Agent, or Firm* — Lewis Roca Rothgerber Christie LLP

(57) ABSTRACT

A rechargeable battery including an electrode assembly including a first electrode, a second electrode, and a separator between the first electrode and the second electrode; a case containing the electrode assembly; a cap plate covering an opening of the case; and an external short circuit assembly on the cap plate and including: a cover on the cap plate; and a terminal plate on the cover and coupled to the cover.

18 Claims, 10 Drawing Sheets

(56) References Cited

U.S. PATENT DOCUMENTS

2009/0317665 A1    12/2009    Maeng et al.
2010/0227205 A1    9/2010    Byun et al.

FOREIGN PATENT DOCUMENTS

| | | |
|---|---|---|
| EP | 2 226 868 A1 | 9/2010 |
| EP | 2 273 587 A1 | 1/2011 |
| EP | 2 299 512 A1 | 3/2011 |
| JP | 06-124697 | 5/1994 |
| JP | 07-201372 | 8/1995 |
| JP | 11-007931 | 1/1999 |
| JP | 11-040203 | 2/1999 |
| JP | 2006-313743 | 11/2006 |
| JP | 2009-021133 | 1/2009 |
| JP | 2010-205728 | 9/2010 |
| KR | 10-2005-0113983 | 12/2005 |
| KR | 1020050113983 * | 12/2005 |
| KR | 10-2006-0111834 A | 10/2006 |
| KR | 10-2007-0054845 A | 5/2007 |
| KR | 10-2009-0132926 | 12/2009 |

OTHER PUBLICATIONS

KIPO Office action dated Jun. 18, 2012, for corresponding Korean Patent application 10-2011-0005071, (3 pages).

European Search Report dated Dec. 19, 2011, for corresponding European Patent application 11160149.8, noting listed references in this IDS, 9 pages.

JPO Office action dated May 28, 2013, for corresponding Japanese Patent application 2011-110586, (4 pages).

Patent Abstracts of Japan, and English machine translation of Japanese Publication 07-201372 dated Aug. 4, 1995, listed above, (5 pages).

Patent Abstracts of Japan, and English machine translation of Japanese Publication 2009-021133 dated Jan. 29, 2009, listed above, (19 pages).

SIPO Office action dated Oct. 23, 2013, with English translation, corresponding to Chinese Patent application 201110199211.9, (16 pages).

* cited by examiner

RECHARGEABLE BATTERY

CROSS-REFERENCE TO RELATED APPLICATION

This application claims the benefit of U.S. Provisional Application No. 61/384,148, filed on Sep. 17, 2010 in the United States Patent and Trademark Office, the disclosure of which is incorporated herein in its entirety by reference.

BACKGROUND

1. Field

Aspects of embodiments of the present invention relate to a rechargeable battery, and more particularly, to a rechargeable battery having an improved structure of a safety device thereof.

2. Description of the Related Art

Rechargeable batteries can be charged and discharged, unlike primary batteries which cannot be recharged. Low-capacity rechargeable batteries are used for portable compact electronic apparatuses such as mobile phones or notebook computers and camcorders, and high-capacity rechargeable batteries are widely used as a power source for driving a motor of a hybrid vehicle, etc.

Recently, a high-output rechargeable battery using a non-aqueous electrolyte having high energy density has been developed. The high-output rechargeable battery is configured with a high-capacity rechargeable battery by connecting a plurality of rechargeable batteries in series so as to be used for driving a motor for an apparatus requiring a large amount of power, such as an electrical vehicle, etc.

In addition, a high-capacity rechargeable battery generally includes a plurality of rechargeable batteries that are coupled in series, and the rechargeable battery may be formed of cylindrical and/or angular shapes.

The rechargeable battery has a structure in which a terminal connected to an electrode assembly where a positive electrode and a negative electrode are disposed with a separator interposed therebetween protrudes outward.

When gas generated by an electrolytic solution which is decomposed by heat generated from inside of the rechargeable battery causes the internal pressure of the rechargeable battery to be abnormally increased, the rechargeable battery may explode. In order to prevent the rechargeable battery from exploding, when the internal pressure of the rechargeable battery increases to a predetermined value or greater, the rechargeable battery should stop being operated.

For example, a safety device having a structure for cutting off current may be installed between a case and the terminal which protrudes outward in order to stop operation of the rechargeable battery.

However, when components constituting the safety device are assembled by a method such as welding, or the like, an assembly process is complicated, work efficiency is deteriorated, and the production cost of the rechargeable battery is increased.

Further, when the safety device is installed outside of a case, a malfunction may occur due to external foreign materials and the like, or the foreign materials may be input into the case.

The above information disclosed in this Background section is only for enhancement of understanding of the background of the invention and therefore it may contain information that does not form the prior art that is already known in this country to a person of ordinary skill in the art.

SUMMARY

According to an aspect of embodiments of the present invention, a rechargeable battery including a safety device can be easily manufactured by stacking components between a case and a terminal in sequence.

According to an exemplary embodiment of the present invention, a rechargeable battery includes an electrode assembly including a first electrode, a second electrode, and a separator between the first electrode and the second electrode; a case containing the electrode assembly; a cap plate covering an opening of the case; and an external short circuit assembly on the cap plate and including: a cover on the cap plate; and a terminal plate on the cover and coupled to the cover.

In one embodiment, the external short circuit assembly further includes a connection tab between the cap plate and the cover. The cover may include a cover body and at least one coupling projection protruding from an end of the cover body.

In one embodiment, the terminal plate has at least one coupling groove on a surface facing the connection tab, and the at least one coupling groove receives the at least one coupling projection. In one embodiment, the at least one coupling projection includes a pair of coupling projections protruding from the end of the cover body.

The at least one coupling projection may extend from a central portion of the end of the cover body. In one embodiment, the at least one coupling projection has an opening receiving a first terminal therein, the first terminal being electrically coupled to the first electrode. In one embodiment, a length of the at least one coupling projection is less than a length of the terminal plate.

In one embodiment, a thickness of the at least one coupling projection extending toward the connection tab is less than a thickness of the cover body.

The external short circuit assembly may further include an insulation member between the cap plate and the connection tab. The insulation member, the connection tab, the cover, and the terminal plate may be sequentially stacked on the cap plate. The insulation member may include a side wall surrounding the connection tab, the cover, and the terminal plate. In one embodiment, the insulation member has an opening, the connection tab has an opening, the terminal plate has an opening, and a first terminal is received in the openings of the insulation member, the connection tab, and the terminal plate, the first terminal being electrically coupled to the first electrode.

In one embodiment, the insulation member includes a first side contacting the cap plate, and a protrusion extending from the cap plate from a second side of the insulation member opposite the first side. The connection tab may have an opening receiving the protrusion of the insulation member therein. The terminal plate may have a recess receiving the protrusion of the insulation member therein.

In one embodiment, a rechargeable battery further includes a variable plate electrically coupled to the second electrode, the insulation member has an opening over the variable plate, and the variable plate protrudes through the opening and is configured to contact the connection tab when an internal pressure of the rechargeable battery exceeds a reference pressure. In one embodiment, a peripheral portion of the variable plate is attached to the cap plate, and an inner portion of the variable plate inside the peripheral portion is arranged within an opening of the cap plate. In one embodiment, the rechargeable battery further includes a terminal protruding outside the case and electrically connected to the cap plate and the second electrode, and the first electrode and the second electrode are short circuited to each other through the cap plate and the terminal when the variable plate contacts the connection tab.

The cover may include an electrically insulative material.

According to another exemplary embodiment of the present invention, a rechargeable battery includes an electrode assembly including a first electrode, a second electrode, and a separator interposed therebetween; a case housing the electrode assembly; an insulation member fastened to the case; a first terminal that is electrically connected to any one electrode of the electrode assembly and extends from the inside to the outside of the case at a fastened portion of the insulation member; a first terminal plate that is coupled to the first terminal and housed in the case; and a cover received in a first insulation member.

According to an aspect of embodiments of the present invention, a safety device of a rechargeable battery includes components stacked in sequence and, as a result, it is possible to improve work efficiency by simplifying an assembly process, thereby saving the production cost of the rechargeable battery.

BRIEF DESCRIPTION OF THE DRAWINGS

The above and other features and advantages will become more apparent to those of ordinary skill in the art by describing in detail some exemplary embodiments of the present invention with reference to the attached drawings. Moreover, additional aspects and/or advantages of embodiments of the present invention are set forth in the following description and accompanying drawings, or may be obvious in view thereof to those skilled in the art.

DESCRIPTION OF REFERENCE NUMERALS INDICATING SOME ELEMENTS IN THE DRAWINGS

Figure 1:
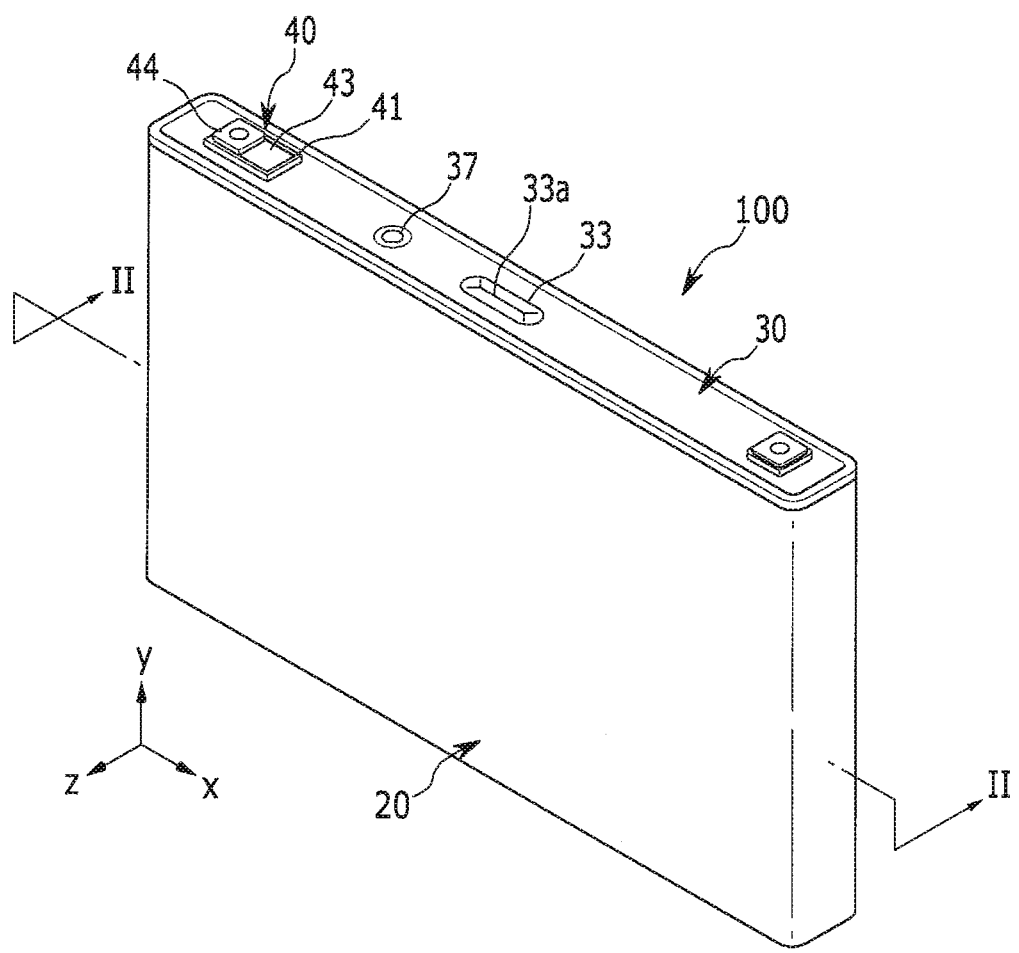
FIG. 1 is a perspective view of a rechargeable battery according to an exemplary embodiment of the present invention.

100: Rechargeable battery    10: Electrode assembly
20: Case                     30: Cap assembly
34: First terminal           35: Second terminal
40, 40a, 40b, 40c: External short-circuit assembly
41: Upper insulation member  42: Connection tab
43, 43a, 43b, 43c: Cover     44, 44a, 44b, 44c: Terminal plate

DETAILED DESCRIPTION

The present invention will be described more fully hereinafter with reference to the accompanying drawings, in which some exemplary embodiments of the invention are shown. However, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. In the specification and drawings, like reference numerals designate like elements.

Figure 2:
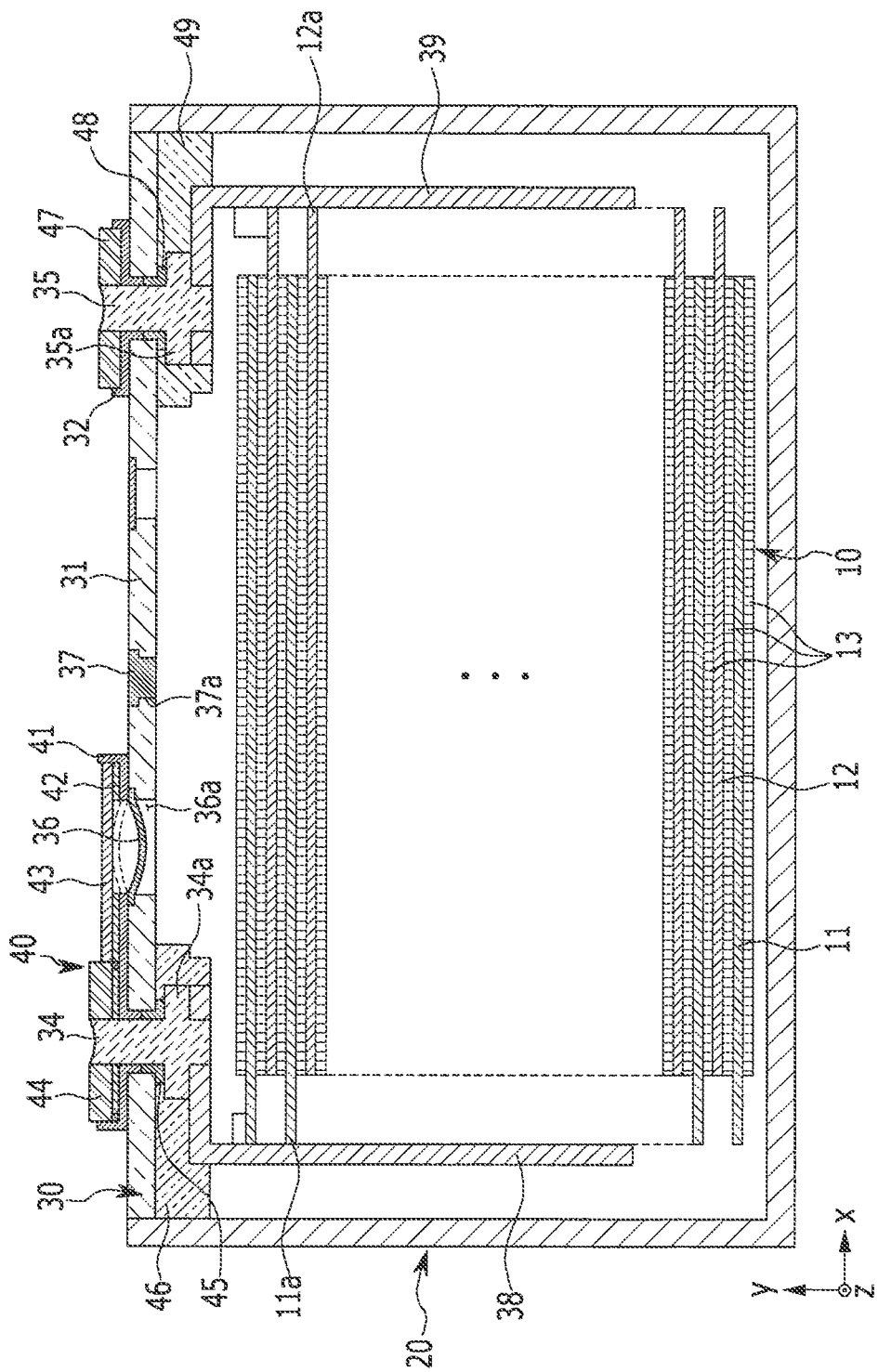
FIG. 2 is a cross-sectional view of the rechargeable battery of FIG. 1, taken along line II-II.

FIG. 1 is a perspective view of a rechargeable battery according to an exemplary embodiment of the present invention, and FIG. 2 is a cross-sectional view taken along line II-II of FIG. 1.

Referring to FIGS. 1 and 2, a rechargeable battery 100 according to an exemplary embodiment of the present invention includes an electrode assembly 10 wound with a separator 13 interposed between a first electrode 11 and a second electrode 12, a case 20 housing the electrode assembly 10, a cap assembly 30 coupled to an opening of the case 20, and an external short-circuit assembly 40.

The rechargeable battery 100, according to one embodiment of the present invention, is a lithium ion rechargeable battery, which has an angular shape and will be described as an example. However, embodiments of the present invention are not limited thereto, and in other embodiments, aspects of the present invention may be applied to batteries such as a lithium polymer battery, and the like. Further, the first electrode may be used as a negative electrode, and the second electrode may be used as a positive electrode. Alternatively, the first electrode may be used as the positive electrode and the second electrode may be used as the negative electrode. However, in the following description of an exemplary embodiment of the present invention, for better understanding and ease of description, the first electrode and the second electrode will be described instead of the negative electrode and the positive electrode.

The first electrode 11 and the second electrode 12 include a coated area where a current collector formed of a thin metal foil is coated with an active material, and uncoated areas 11a and 12a where the current collector is not coated with the active material.

In one embodiment, the first electrode uncoated area 11a is formed on one side end of the first electrode 11 in the length direction of the first electrode 11, and the second electrode uncoated area 12a is formed on the other end of the second electrode 12 in the length direction of the second electrode 12. In addition, the first electrode 11 and the second electrode 12 are wound with the separator 13, which is an insulator, interposed therebetween.

However, embodiments of the present invention are not limited thereto. For example, in another embodiment, the electrode assembly 10 may have a structure in which the first electrode and the second electrode which are formed by a plurality of sheets are stacked with the separator interposed therebetween.

As shown in FIG. 2, the case 20 is formed of metal having a substantially rectangular parallelepiped shape and has an opening which is open on one surface thereof. The cap assembly 30 includes a cap plate 31 covering the opening, a first terminal 34 electrically connected to the first electrode 11 and a second terminal 35 electrically connected to the second electrode 12 which protrude outwardly from the cap plate 31, and a variable plate 36 electrically connected to the second terminal 35.

The cap plate 31 is formed of a thin plate and is coupled to the opening of the case 20. An electrolytic solution inlet 37a is formed in the cap plate 31 and a sealing plug 37 is installed on the electrolytic solution inlet 37a.

The first terminal 34 and the second terminal 35, in one embodiment, penetrate the cap plate 31 and include flanges 34a and 35a supported on the bottom of the cap plate 31 formed in lower portions thereof.

In one embodiment, a gasket 45 is installed between the first terminal 34 and the cap plate 31 and a gasket 48 is installed between the second terminal 35 and the cap plate 31 to insulate the terminals 34 and 35 from the cap plate 31.

In one embodiment, the first terminal 34 is electrically connected to the first electrode 11 through a first lead tab 38, and the second terminal 35 is electrically connected to the second electrode 12 through a second lead tab 39.

In one embodiment, lower insulation members 46 and 49 are disposed below the cap plate 31, and lower ends of the first and second terminals 34 and 35 and upper ends of the first and second lead tabs 38 and 39 are inserted into or are adjacent the lower insulation members 46 and 49.

In one embodiment, a short-circuit hole 36a is formed in the cap plate 31, and the variable plate 36 is inserted into the short-circuit hole 36a.

The variable plate 36 is attached to the cap plate 31, such as by welding, and includes a periphery having a flat ring shape and a transformable portion which is formed inside of the periphery and is curved and protruded in an arc shape toward the electrode assembly 10. As a result, the variable plate 36 is electrically connected to the second terminal 35 through the cap plate 31.

A second terminal plate 47 is rivet-coupled to the second terminal 35, and a conductive connection member 32 is installed between the second terminal 35 and the cap plate 31. Therefore, the connection member 32 serves to electrically connect the cap plate 31 to the second terminal 35.

Figure 3:
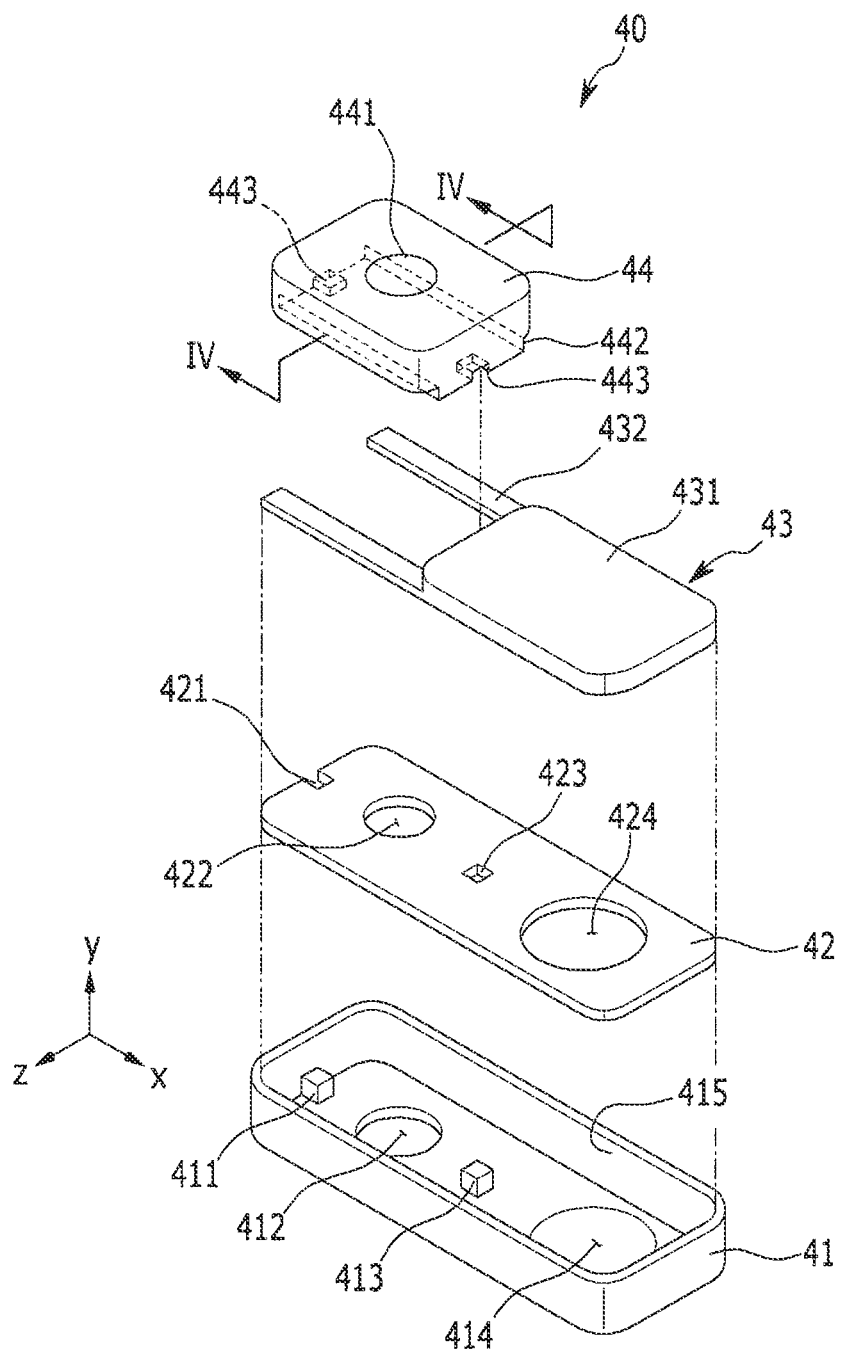
FIG. 3 is an exploded perspective view of an external short-circuit assembly of the rechargeable battery of FIG. 1.
Figure 4:
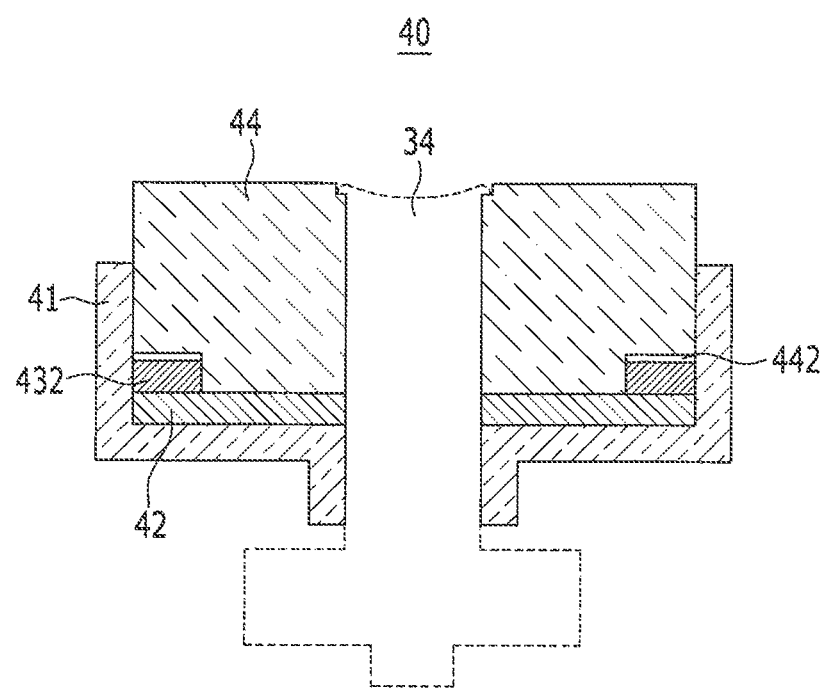
FIG. 4 is a cross-sectional view of the external short-circuit assembly of FIG. 3, taken along line IV-IV.

FIG. 3 is an exploded perspective view of the external short-circuit assembly according to an exemplary embodiment of the present invention, and FIG. 4 is a cross-sectional view taken along line IV-IV while the external short-circuit assembly 40 is coupled.

The external short-circuit assembly 40 according to an exemplary embodiment of the present invention includes an upper insulation member 41 installed in the cap plate 31, a connection tab 42 electrically connected to the first terminal 34, a cover 43, and a terminal plate 44.

As shown in FIG. 3, the upper insulation member 41, which has a rectangular parallelepiped shape of which an upper portion is open, includes a first fixation hole 412 penetrated by the first terminal 34, fixation projections 411 and 413, and a first connection hole 414 corresponding to the shaft-circuit hole 36a located at the bottom thereof. Further, the upper insulation member 41 includes a side wall 415 formed by connecting a pair of short sides and a pair of long sides that face each other to cover the side end of the connection tab 42.

The upper insulation member 41 installed in the cap plate 31 is made of an insulative material and serves to insulate the first terminal 34 from the cap plate 31. Further, the upper insulation member 41 provides a space in which the connection tab 42, the cover 43, and the terminal plate 44 are sequentially stacked through an upper opening of the upper insulation member 41 to be fixed but, in an exemplary embodiment, are not welded to each other.

As shown in FIG. 3, the connection tab 42 has a plate-like shape having a predetermined thickness and is made of a conductive material. Holes 421 and 423 are formed in parts of the connection tab 42 which correspond to the fixation projections 411 and 413.

The fixation projections 411 and 413 formed in the upper insulation member 41 are inserted into and fixed to the holes 421 and 423 formed in the connection tab 42. As a result, the connection tab 42 is stacked and stably fixed to the upper insulation member 41, and even when a pressing force is applied due to the transformation of the variable plate 36, a movement or transformation of the connection tab 42 is minimized or reduced.

Further, a second fixation hole 422 is formed in a part of the connection tab 42 which corresponds to the first fixation hole 412 of the upper insulation member 41 to allow the first terminal 34 to penetrate the cap plate 31 and the upper insulation member 41. In this case, the first terminal 34 contacts the inner circumference of the second fixation hole 422 to be electrically connected to the connection tab 42.

Further, in one embodiment, a second connection hole 424 is formed in a part of the connection tab 42 which corresponds to the first connection hole 414 of the upper insulation member 41.

Referring to FIG. 2, when the internal pressure of the rechargeable battery 100 is excessively increased (e.g., when the internal pressure exceeds a predetermined pressure), the transformable portion of the variable plate 36 which otherwise protrudes downward is inverted upward to contact the inner circumference of the second connection hole 424 of the connection tab 42. In this case, the first electrode 11 and the second electrode 12 are short-circuited to each other. The second connection hole 424 increases a contact area between the variable plate 36 and the first connection tab 42 to stably contact the variable plate 36 and the connection tab 42 with each other.

As shown in FIG. 3, the cover 43 includes a cover body 431 and a pair of coupling projections 432 that are projected from the bottom of an end of the cover body 431 and are spaced apart from each other.

The cover body 431 has a plate-like shape having a predetermined thickness and is stacked at an upper side of the connection tab 42. That is, one end of the cover body 431 is closely attached to a short side positioned at the right side of the upper insulation member 41 as shown in FIG. 3, and the other end of the cover body 431 is housed in the upper insulation member 41 to be positioned between the hole 423 and the second connection hole 424 of the connection tab 42.

Accordingly, the cover body 431 serves to protect the connection tab 42 from an impact applied from the outside of the case 20 and prevent or substantially prevent external foreign materials from being introduced into the case 20 through the second connection hole 424.

The coupling projections 432 extend from the bottom of the end (i.e. the left end as shown in FIG. 3) of the cover body 431 that is positioned between the hole 423 and the second connection hole 424 of the connection tab 42.

In one embodiment, the pair of coupling projections 432 that face each other have a bar shape having a thickness smaller than the cover body 431 and, as shown in FIG. 3, the coupling projections 432 are spaced apart from each other to extend in an x-axis direction from the bottom of the end of the first cover body 431. In one embodiment, the coupling projections 432 have a length contacting the inside of a short side positioned at the left side of the upper insulation member 41 as shown in FIG. 3. However, in another embodiment, the coupling projections 432 may have a length not contacting the inside of the short side positioned at the left side of the upper insulation member 41 as shown in FIG. 3.

Accordingly, when the pair of coupling projections 432 is stacked on the top of the connection tab 42 to allow the terminal plate 44 to be stacked on the coupling projection 432, the coupling projections 432 serve to fix the cover 43 to the upper insulation member 41.

In one embodiment, the cover 43 may be formed by coupling the cover body 431 and the coupling projections 432 together after the cover body 431 and the coupling projections 432 are separately manufactured or, alternatively, the cover body 431 and the coupling projections 432 may be integrally manufactured.

In the case in which the cover body 431 and the coupling projections 432 are separately manufactured, any one of the cover body 431 and the coupling projections 432 may be made of a conductive material or an insulative material, or both of them may be made of a conductive material or an insulative material. In one embodiment, one or both of the coupling projections 432 are made of a conductive material and are electrically connected to the terminal plate 44 and the connection tab 42. In one embodiment, the cover body 431 is made of a conductive material and is electrically connected to the terminal plate 44 and the connection tab 42.

Further, if the cover body 431 and the coupling projections 432 are integrally manufactured, both the cover body 431 and the coupling projections 432 may be made of a conductive material or an insulative material. In one embodiment, the cover body 431 and the coupling projections 432 are made of a conductive material and are electrically connected to the terminal plate 44 and the connection tab 42.

As shown in FIG. 3, in one embodiment, the terminal plate 44 has a rectangular parallelepiped shape and is made of a conductive material. A third fixation hole 441 is formed in a part of the terminal plate 44 which corresponds to the second fixation hole 422 formed in the connection tab 42. Further, a pair of coupling grooves 442 to which the coupling projections 432 are respectively fixed is formed on the bottom of the terminal plate 44.

In one embodiment, the terminal plate 44 has a thickness greater than that of the cover 43 to be easily connected to an external connection member (not shown) to serve to draw out electric power generated from the first terminal 34 to the outside. The terminal plate 44 supports the other end of the cover 43, which is fixed to the upper insulation member 41.

More specifically, the terminal plate 44 is inserted onto the first terminal 34 through the third fixation hole 441, and is stacked on the connection tab 42 and housed in the upper insulation member 41. In one embodiment, the first terminal 34 contacts the inner circumference of the third fixation hole 441 to be electrically connected to the terminal plate 44.

Further, referring to FIG. 4, the coupling projections 432 are received in the respective coupling grooves 442 to fix the cover 43 to the upper insulation member 41. Herein, if the groove depth of the coupling grooves 442 is less than or equal to the thickness of the coupling projections 432, the terminal plate 44 is stacked on the connection tab 42 and may be difficult to contact the connection tab 42. Accordingly, in one embodiment, the groove depth of the coupling grooves 442 is greater than the thickness of the coupling projections 432.

In one embodiment, the terminal plate 44 has recesses 443 at locations which correspond to the fixation projections 411 and 413 formed in the upper insulation member 41, and the fixation projections 411 and 413 are inserted into and fixed to the recesses 443 formed in the terminal plate 44. As a result, the terminal plate 44 is stacked and stably fixed to the upper insulation member 41.

The terminal plate 44, in one embodiment, is coupled to the first terminal 34 by a rivet. Finally, the terminal plate 44 is fixed by the first terminal 34 and the cover 43 is fixed to the upper insulation member 41 by the coupling members 432 that are fixed by the terminal plate 44.

That is, in an exemplary embodiment, the external short-circuit assembly 40 is completed by sequentially stacking the connection tab 42, the cover 43, and the terminal plate 44 in the upper insulation member 41. As a result, work efficiency is improved due to the simple assembly process and production costs of the external short-circuit assembly 40 are saved.

Figure 5:
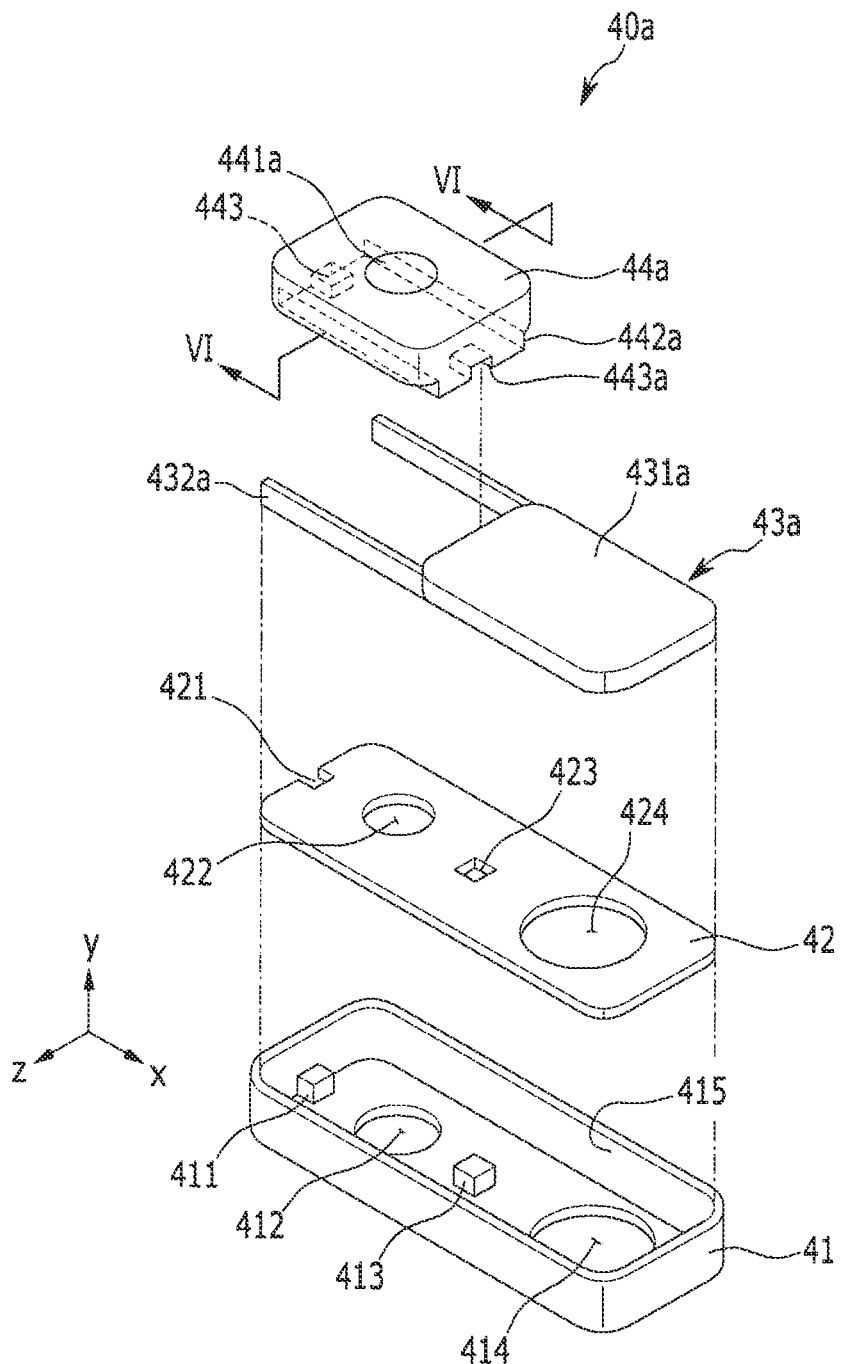
FIG. 5 is an exploded perspective view of an external short-circuit assembly of a rechargeable battery according to another exemplary embodiment of the present invention.
Figure 6:
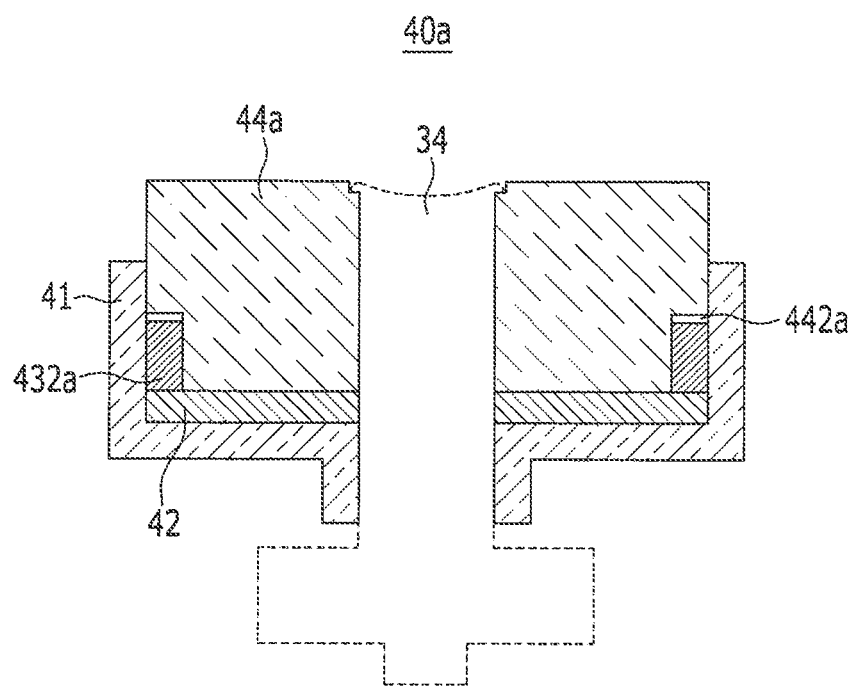
FIG. 6 is a cross-sectional view of the external short-circuit assembly of FIG. 5, taken along line VI-VI.

FIG. 5 is an exploded perspective view of an external short-circuit assembly 40a according to another exemplary embodiment of the present invention, and FIG. 6 is a cross-sectional view taken along line VI-VI while the external short-circuit assembly 40a shown in FIG. 5 is coupled.

A rechargeable battery including the external short-circuit assembly 40a shown in FIGS. 5 and 6 may have the same structure as the rechargeable battery 100 described above except for a cover 43a and a terminal plate 44a of the external short-circuit assembly 40a. Therefore, description of the same components and structure will not be repeated herein.

The external short-circuit section 40a according to an exemplary embodiment of the present invention includes the upper insulation member 41 installed in the cap plate 31, the connection tab 42 that is electrically connected to the first terminal 34, the cover 43a, and the terminal plate 44a.

As shown in FIG. 5, the cover 43a includes a cover body 431a which has a plate-like shape having a thickness and a pair of coupling projections 432a.

In one embodiment, the coupling projections 432a extend from both sides of an end of the cover body 431a that is positioned between the hole 423 and the second connection hole 424 of the connection tab 42.

In one embodiment, the pair of coupling projections 432a face each other, have a bar shape having a thickness less than that of the cover body 431a, and, as shown in FIG. 5, extend from both side surfaces of an end (i.e. the left end, as shown in FIG. 5) of the cover body 431a in an x-axis direction. In one embodiment, the coupling projections 432a have a length contacting the inside of a short side positioned at the left side of the upper insulation member 41 as shown in FIG. 5. However, in another embodiment, the coupling projections 432a may have a length not contacting the inside of the short side positioned at the left side of the upper insulation member 41 as shown in FIG. 5.

Accordingly, when the pair of coupling projections 432a are stacked on top of the connection tab 42 to allow the terminal plate 44a to be stacked on the coupling projections 432a, they serve to fix the cover 43a to the upper insulation member 41.

As shown in FIG. 5, the terminal plate 44a, in one embodiment, has a rectangular parallelepiped shape, is made of a conductive material, and has a third fixation hole 441a formed in a part of the terminal plate 44a which corresponds to the second fixation hole 422 formed in the connection tab 42.

Further, a pair of coupling grooves 442a to which the coupling projections 432a are fixed are formed on the bottom of the terminal plate 44a.

If the groove depth of the coupling grooves 442a is less than or equal to the thickness of the coupling projections 432a, the terminal plate 44a is stacked on the connection tab 42 and may be difficult to contact the connection tab 42. Accordingly, in one embodiment, as shown in FIG. 6, the groove depth of the coupling grooves 442a is greater than the thickness of the coupling projections 432a.

In one embodiment, the terminal plate 44a has recesses 443a at locations which correspond to the fixation projections 411 and 413 formed in the upper insulation member 41, and the fixation projections 411 and 413 are inserted into and fixed to the recesses 443a formed in the terminal plate 44a. As a result, the terminal plate 44a is stacked and stably fixed to the upper insulation member 41.

The terminal plate 44a, in one embodiment, is coupled to the first terminal 34 by a rivet. Finally, the terminal plate 44a is fixed by the first terminal 34, and the cover 43a is fixed to the upper insulation member 41 by the coupling projections 432a fixed by the terminal plate 44a.

That is, in an exemplary embodiment, the external short-circuit assembly 40a is completed by sequentially stacking the connection tab 42, the cover 43a, and the terminal plate 44a in the upper insulation member 41. As a result, work efficiency is improved due to the simple assembly process and production costs of the external short-circuit assembly 40a are saved.

Figure 7:
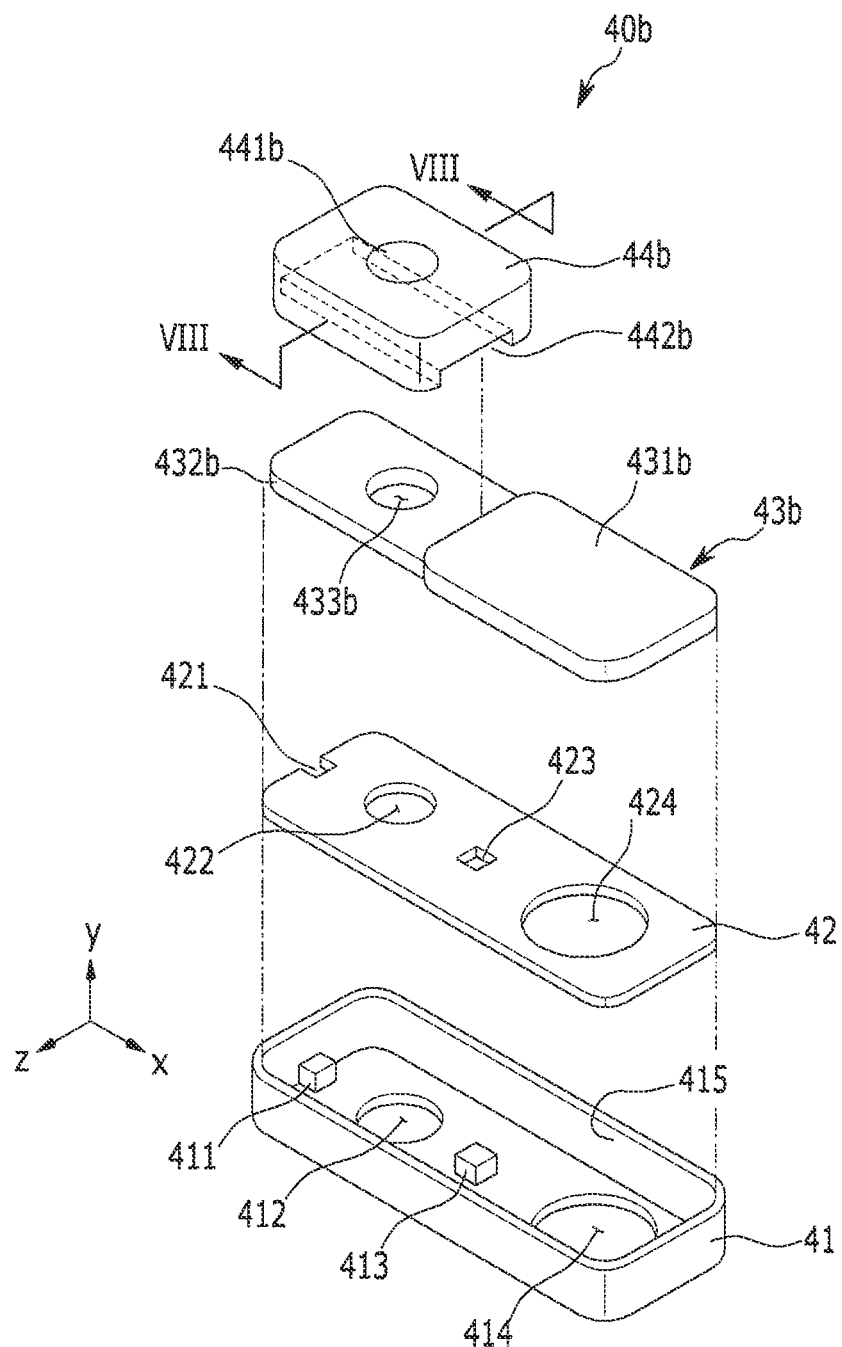
FIG. 7 is an exploded perspective view of an external short-circuit assembly of a rechargeable battery according to another exemplary embodiment of the present invention.
Figure 8:
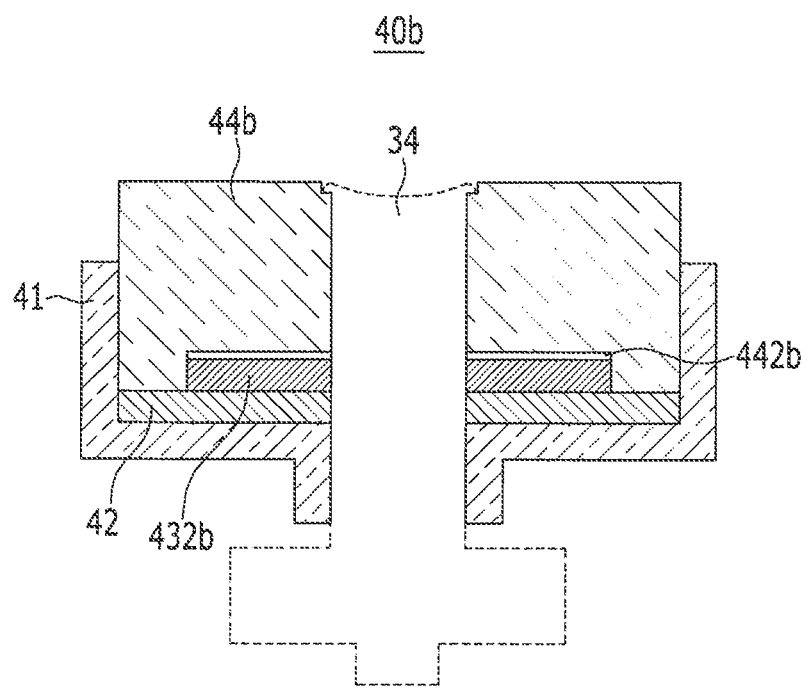
FIG. 8 is a cross-sectional view of the external short-circuit assembly of FIG. 7, taken along line VIII-VIII.

FIG. 7 is an exploded perspective view of an external short-circuit assembly 40b according to another exemplary embodiment of the present invention, and FIG. 8 is a cross-sectional view taken along line VIII-VIII while the external short-circuit assembly 40b shown in FIG. 7 is coupled.

A rechargeable battery including the external short-circuit assembly 40b shown in FIGS. 7 and 8 may have the same structure as the rechargeable battery 100 described above except for a cover 43b and a terminal plate 44b of the external short-circuit assembly 40b. Therefore, description of the same components and structure will not be repeated herein.

The external short-circuit section 40b according to an exemplary embodiment of the present invention includes the upper insulation member 41 installed in the cap plate 31, the connection tab 42 that is electrically connected to the first terminal 34, the cover 43b, and the terminal plate 44b.

As shown in FIG. 7, the cover 43b includes a cover body 431b having a plate-like shape having a thickness and a coupling projection 432b which projects from the bottom of an end of the cover body 431b.

The coupling projection 432b, in one embodiment, extends from the bottom of the end of the cover body 431b that is positioned between the hole 423 and the second connection hole 424 of the connection tab 42.

In one embodiment, the coupling projection 432b has a plate-like shape having a thickness less than that of the cover body 431b and, as shown in FIG. 7, the coupling projection 432b extends on the bottom of the left end of the cover body 431b in an x-axis direction. In one embodiment, the coupling projection 432b has a length contacting the inside of a short side positioned at the left side of the upper insulation member 41 as shown in FIG. 7. However, in another embodiment, the coupling projection 432b may have a length not contacting the inside of the short side positioned at the left side of the upper insulation member 41 as shown in FIG. 7. Further, a fourth fixation hole 433b is formed in a part corresponding to the second fixation hole 422 of the connection tab 42.

That is, when the coupling projection 432b is stacked on top of the connection tab 42 and the terminal plate 44b is stacked on the coupling projection 432b, the coupling projection 432b serves to fix the cover 43b to the upper insulation member 41.

As shown in FIG. 7, in one embodiment, the terminal plate 44b has a rectangular parallelepiped shape, is made of a conductive material, and has a third fixation hole 441b formed in a part of the terminal plate 44b which corresponds to the second fixation hole 422 formed in the connection tab 42. Further, a coupling groove 442b in which the coupling projection 432b is received is formed on the bottom of the terminal plate 44b.

If the groove depth of the coupling groove 442b is less than or equal to the thickness of the coupling projection 432b, the terminal plate 44b is stacked on the connection tab 42 and may be difficult to contact the connection tab 42. Accordingly, in one embodiment, as shown in FIG. 8, the groove depth of the coupling groove 442b is greater than the thickness of the coupling projection 432b.

The terminal plate 44b, in one embodiment, is coupled to the first terminal 34 by a rivet. Finally, the terminal plate 44b is fixed by the first terminal 34, and the cover 43b is fixed to the upper insulation member 41 by the coupling member 432b that is fixed by the terminal plate 44b.

That is, in an exemplary embodiment, the external short-circuit assembly 40b is completed by sequentially stacking the connection tab 42, the cover 43b, and the terminal plate 44b in the upper insulation member 41. As a result, work efficiency is improved due to the simple assembly process and production costs of the external short-circuit assembly 40b are saved.

Figure 9:
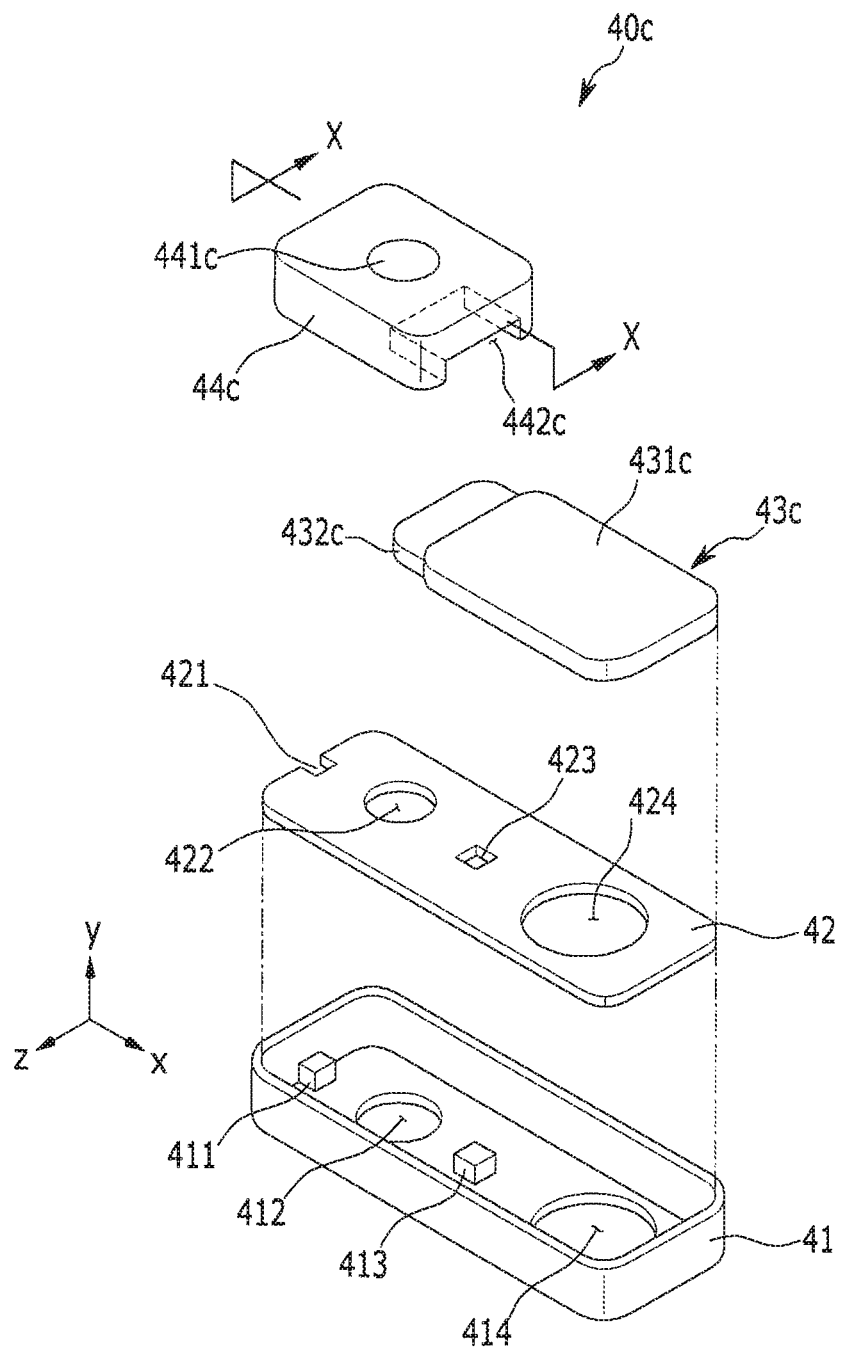
FIG. 9 is an exploded perspective view of an external short-circuit assembly of a rechargeable battery according to another exemplary embodiment of the present invention.
Figure 10:
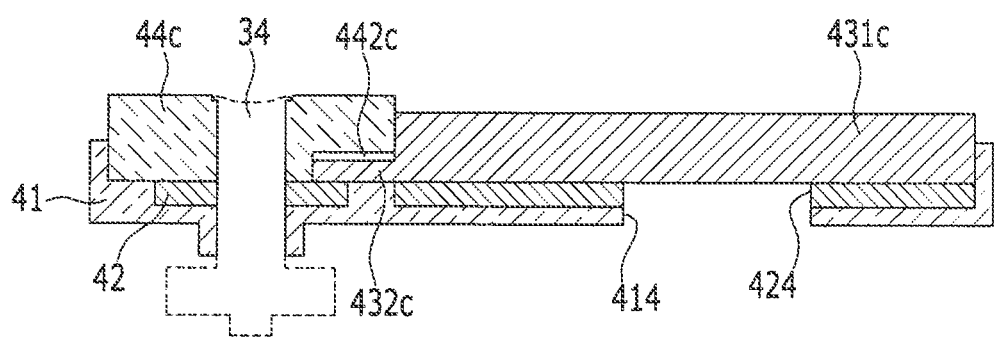
FIG. 10 is a cross-sectional view of the external short-circuit assembly of FIG. 9, taken along line X-X.

FIG. 9 is an exploded perspective view of an external short-circuit assembly 40c according to another exemplary embodiment of the present invention, and FIG. 10 is a cross-sectional view taken along line X-X while the external short-circuit assembly 40c shown in FIG. 9 is coupled.

A rechargeable battery including the external short-circuit assembly 40c shown in FIGS. 9 and 10 may have the same structure as the rechargeable battery 100 described above except for a cover 43c and a terminal plate 44c of the external short-circuit assembly 40c. Therefore, description of the same components and structure will not be repeated herein.

The external short-circuit assembly 40c according to an exemplary embodiment of the present invention includes the upper insulation member 41 installed in the cap plate 31, the connection tab 42 that is electrically connected to the first terminal 34, a cover 43c, and a terminal plate 44c.

As shown in FIG. 9, in one embodiment, the cover 43c includes a cover body 431c having a plate-like shape and having a predetermined thickness and includes a coupling projection 432c that projects from the bottom of an end of the cover body 431c.

The fourth coupling projection 432c extends from the bottom of an end of the cover body 431c that is positioned between the hole 423 and the second connection hole 424 of the connection tab 42.

In one embodiment, the coupling projection 432c has a plate-like shape having a thickness less than that of the cover body 431c and, as shown in FIG. 9, the coupling projection 432c extends on the bottom of the left end of the cover body 431c in an x-axis direction. The coupling projection 432c, in one embodiment, extends to a space between the second fixation hole 422 and the hole 423 positioned at the left side of the upper insulation member 41 as shown in FIG. 9.

That is, when the coupling projection 432c is stacked on top of the connection tab 42 and the terminal plate 44c is stacked on the coupling projection 432c, the coupling projection 432c serves to fix the cover 43c to the upper insulation member 41.

As shown in FIG. 9, in one embodiment, the terminal plate 44c has a rectangular parallelepiped shape, is made of a conductive material, and has a third fixation hole 441c formed in a part of the terminal plate 44c which corresponds to the second fixation hole 422 formed in the connection tab 42. Further, a coupling groove 442c into which the coupling projection 432c is received is formed on the bottom of the terminal plate 44c.

If the groove depth of the coupling groove 442c is less than or equal to the thickness of the coupling projection 432c, the terminal plate 44c is stacked on the connection tab 42 and may be difficult to contact the connection tab 42. Accordingly, in one embodiment, as shown in FIG. 10, the groove depth of the coupling groove 442c is greater than the thickness of the coupling projection 432c.

In one embodiment, the terminal plate 44c is coupled to the first terminal 34 by a rivet. Finally, the terminal plate 44c is fixed by the first terminal 34, and the cover 43c is fixed to the upper insulation member 41 by the coupling member 432c that is fixed by the terminal plate 44c.

That is, in an exemplary embodiment, the external short-circuit assembly 40c is completed by sequentially stacking the connection tab 42, the cover 43c, and the terminal plate 44c in the upper insulation member 41. As a result, work efficiency is improved due to the simple assembly process and production costs of the external short-circuit assembly 40c are saved.

While this invention has been described in connection with what is presently considered to be some exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly comprising a first electrode, a second electrode, and a separator between the first electrode and the second electrode;
a case containing the electrode assembly;
a cap plate covering an opening of the case and having a short-circuit opening formed therethrough;
an external short circuit assembly on the cap plate and comprising:
a connection tab on the cap plate and electrically coupled to the first electrode;
a cover on the connection tab and covering the short-circuit opening of the cap plate; and
a terminal plate on the cover and coupled to the cover,
wherein the connection tab, the cover, and the terminal plate are stacked on an outer side of the cap plate facing an outside of the case,
wherein the connection tab is between the cap plate and the cover, and the cover is between the connection tab and the terminal plate, and
wherein the cover comprises a cover body and at least one coupling projection protruding from an end of the cover body; and
a variable plate at the short-circuit opening of the cap plate and electrically coupled to the second electrode, the variable plate configured to contact the connection tab and short circuit the first electrode and the second electrode to each other when an internal pressure of the rechargeable battery exceeds a reference pressure.

2. The rechargeable battery of claim 1, wherein the terminal plate has at least one coupling groove on a surface facing the connection tab, the at least one coupling groove receiving the at least one coupling projection.

3. The rechargeable battery of claim 1, wherein the at least one coupling projection comprises a pair of coupling projections protruding from the end of the cover body.

4. The rechargeable battery of claim 1, wherein the at least one coupling projection extends from a central portion of the end of the cover body.

5. The rechargeable battery of claim 4, wherein the at least one coupling projection has a fixation hole for receiving a first terminal therein, the first terminal being electrically coupled to the first electrode.

6. The rechargeable battery of claim 4, wherein a length of the at least one coupling projection is less than a length of the terminal plate.

7. The rechargeable battery of claim 1, wherein a thickness of the at least one coupling projection extending toward the connection tab is less than a thickness of the cover body.

8. The rechargeable battery of claim 1, wherein the external short circuit assembly further comprises an insulation member between the cap plate and the connection tab.

9. The rechargeable battery of claim 8, wherein the insulation member, the connection tab, the cover, and the terminal plate are sequentially stacked on the cap plate.

10. The rechargeable battery of claim 9, wherein the insulation member comprises a side wall surrounding the connection tab, the cover, and the terminal plate.

11. The rechargeable battery of claim 9, wherein the insulation member has an opening, the connection tab has an opening, the terminal plate has an opening, and a first terminal is received in the openings of the insulation member, the connection tab, and the terminal plate, the first terminal being electrically coupled to the first electrode.

12. The rechargeable battery of claim 8, wherein the insulation member comprises a first side contacting the cap plate, and a protrusion extending in a direction away from the cap plate from a second side of the insulation member opposite the first side.

13. The rechargeable battery of claim 12, wherein the connection tab has an opening receiving the protrusion of the insulation member therein.

14. The rechargeable battery of claim 13, wherein the terminal plate has a recess receiving the protrusion of the insulation member therein.

15. The rechargeable battery of claim 8, wherein the insulation member has an opening over the variable plate, and the variable plate protrudes through the opening to contact the connection tab when the internal pressure of the rechargeable battery exceeds the reference pressure.

16. The rechargeable battery of claim 15, wherein a peripheral portion of the variable plate is attached to the cap plate, and an inner portion of the variable plate inside the peripheral portion is arranged within the short-circuit opening of the cap plate.

17. The rechargeable battery of claim 16, further comprising a terminal protruding outside the case and electrically connected to the cap plate and the second electrode, wherein the first electrode and the second electrode are short circuited to each other through the cap plate and the terminal when the variable plate contacts the connection tab.

18. The rechargeable battery of claim 1, wherein the cover comprises an electrically insulative material.

* * * * *